(No Model.)
S. R. DRESSER.
DETACHABLE COUPLING.
No. 550,601. Patented Dec. 3, 1895.
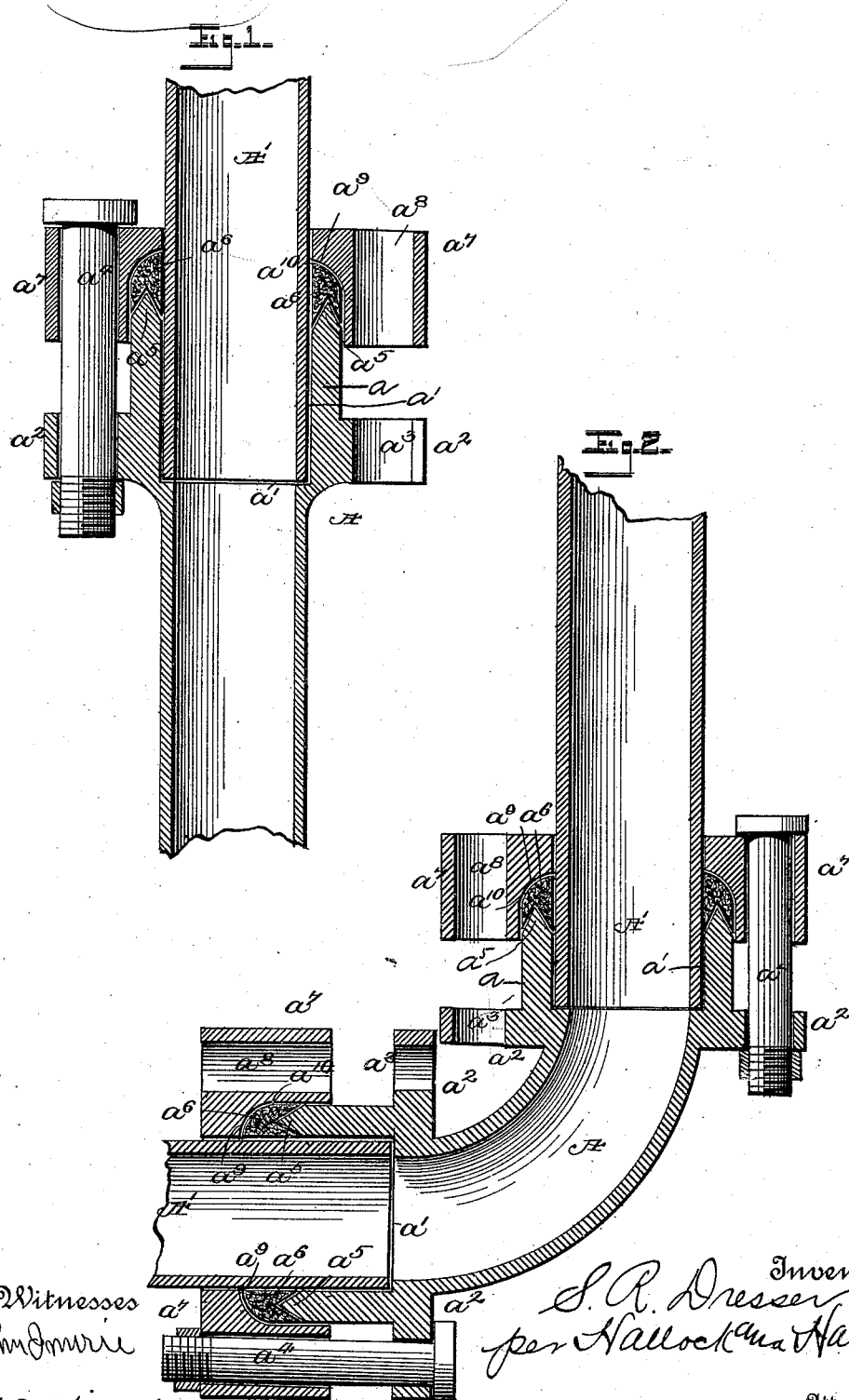
Witnesses
John Imrie
L. R. Miller
Inventor
S. R. Dresser
per Hallock and Hallock
Attorneys

UNITED STATES PATENT OFFICE.

SOLOMON R. DRESSER, OF BRADFORD, PENNSYLVANIA.

DETACHABLE COUPLING.

SPECIFICATION forming part of Letters Patent No. 550,601, dated December 3, 1895.

Application filed October 13, 1893. Serial No. 488,023. (No model.)

*To all whom it may concern:*

Be it known that I, SOLOMON R. DRESSER, a citizen of the United States, residing at Bradford, in the county of McKean and State of Pennsylvania, have invented certain new and useful Improvements in Detachable Couplings; and I do hereby declare the following to be a full, clear, and exact description of the invention, such as will enable others skilled in the art to which it appertains to make and use the same.

My invention relates to that class of detachable couplings in which one or all the ends of a cast-iron pipe L T, stop-cock, gate-valve, throttle, long sleeve, or other device to which pipes are attached are provided with a bell or bells for the insertion of a pipe or pipes, in which packing is held by a follower or other device by means of screws or other retaining devices. In devices of this kind the packing is put at the bottom of the bell part of the casting and is very difficult to remove if it be desired to unjoint the pipe or casting for any purpose. Furthermore, the making of the bell provided with extensions for the screw adds considerable metal to the pipe and also makes an ungainly-looking joint.

The object of my invention is to modify the construction of the bell-joint in such manner that the unsightly external appearance will be removed and a large per cent. of the metal heretofore used in making the bell saved, and in arranging the packing so that when the follower is removed it can be easily taken from its position no matter what pressure it may have been subjected to while in place.

The invention consists of constructions and combinations, all as will hereinafter be set forth in the specification and pointed out in the claims, reference being had to the accompanying drawings, in which—

Figure 1 represents a section of two pipes and my improved joint, and Fig. 2 a similar section showing the manner of applying my joint to an elbow or L.

As it is obvious from an examination of these figures that the joint could be applied to all the varied forms in which a bell is used, it is deemed unnecessary to show the improvement in connection with other forms.

In making the part commonly called the "bell" I give to the part an extension parallel to the pipe that is to be inserted instead of the flare that the bell must have to admit a pipe of the same diameter as the pipe or other device that it forms a part.

In the drawings, A represents a body having such an extension $a$ as above referred to. The interior of the extension $a$ has an annular inset $a'$, so that a connecting-pipe of the same diameter as the body A can be inserted in the extension. It also has an external flange $a^2$, provided with a number of openings $a^3$ for retaining-bolts $a^4$. The outer end $a^5$ of the extension is preferably wedge-shaped in cross-section, and upon it is placed a packing $a^6$, preferably having its under side shaped in intaglio the same as the end $a^5$ of the extension. The wedge shape is preferred, as the inclined sides of the wedge will spread the packing in two directions. The packing $a^6$ is covered by a follower $a^7$, having openings $a^8$ for the retaining-bolts $a^4$, which when set in place draws the follower upon the packing and causes the latter to be compressed upon the extension $a$. This compression of the packing causes it to expand laterally against the pipe A' and the inner side of the follower. This inner side $a^9$ of the follower may be curved, as shown, and the outer side $a^{10}$ of the packing given a similar shape, so that when the packing is compressed the resultant of the forces will be inward and downward, thus filling all the spaces between the several parts.

If it be desired to remove the pipe A', the follower is released from its retaining device and slipped back upon pipe A'. The packing can also be served the same way. Such, however, would not be the case if the packing were inserted in the bottom of a bell instead of upon the end of the extension, as shown. If inserted in a bell, it would have to be dug out and perhaps mined before that result could be accomplished, whereas by placing it upon the end of the extension access upon all sides except the bottom could be had, an advantage highly appreciated by handlers of this form of device.

A prominent feature of my invention is that I provide for the expansion and contraction of the pipe when coupled together, thus avoiding all breaking of the pipe or its couplings, as frequently occurs under other constructions. This is accomplished by fitting my follower loosely upon the pipe and securing the two sections of pipe together by the elastic packing, so that the parts are capable of movement to expand and contract without causing leakage. I also avoid all screw-threaded connections, as such connections would defeat this object of my invention.

What I claim as new is—

1. In a detachable pipe coupling, a body having an extension parallel and in contact with the exterior periphery of a plain end pipe to be inserted therein, and having an annular inset to receive said pipe, a packing mounted upon the end of said extension, a follower fitting loosely upon said pipe and embracing said packing, and means for compressing said packing and holding the parts together, substantially as described.

2. In a detachable pipe coupling, a body having an extension parallel and in contact with the exterior periphery of a plain end pipe to be inserted therein, and having an external flange, and an internal inset of substantially the same diameter as said pipe, a packing mounted upon said extension, a follower fitting loosely upon said pipe and having openings and bolts passing through said openings and the external flange upon the extension, substantially as described.

3. In a detachable coupling, a body having an extension parallel with the pipe to be inserted therein, and having an annular inset to receive said pipe, a packing having a recess therein into which the end of the extension enters, a follower fitting loosely upon said pipe and embracing said packing, and means for compressing said packing and holding the parts together, substantially as described.

In testimony whereof I affix my signature in presence of two witnesses.

SOLOMON R. DRESSER.

Witnesses:
GEO. P. BOOTHE,
JAS. JOHNSTON.